United States Patent [19]

Dennis et al.

[11] Patent Number: 5,604,847
[45] Date of Patent: Feb. 18, 1997

[54] SYSTEM AND METHOD OF PRINTER BANDING

[75] Inventors: Stephen V. Dennis, Bothell; Gabe L. Newell, Seattle, both of Wash.

[73] Assignee: Microsoft Corporation, Redmond, Wash.

[21] Appl. No.: 478,503

[22] Filed: Jun. 7, 1995

Related U.S. Application Data

[62] Division of Ser. No. 911,523, Jul. 10, 1992.

[51] Int. Cl.$^6$ ..................................................... G06F 15/00
[52] U.S. Cl. ............................ 395/116; 395/115; 395/507
[58] Field of Search ................................ 395/112, 114, 395/115, 116, 164, 165, 166, 109, 110, 117, 129, 133, 135, 141, 147; 358/404, 444, 296; 345/189, 133, 201, 127

[56] References Cited

U.S. PATENT DOCUMENTS

| 4,896,275 | 1/1990 | Jackson | 395/115 |
|---|---|---|---|
| 5,115,493 | 5/1992 | Jeanblanc et al. | 395/116 |
| 5,191,430 | 3/1993 | Sudoh et al. | 395/115 |
| 5,303,334 | 4/1994 | Snyder et al. | 395/109 |

FOREIGN PATENT DOCUMENTS

| 0167166 | 1/1986 | European Pat. Off. | G06F 3/12 |
|---|---|---|---|
| 0229539 | 7/1987 | European Pat. Off. | G06K 15/22 |
| 0435190 | 7/1991 | European Pat. Off. | B41J 5/30 |
| 0470782 | 2/1992 | European Pat. Off. | G06K 15/00 |

OTHER PUBLICATIONS

"Printing Raster Graphics By Using Swaths And A Simple Method for Breaking Up Arcs, Circles or Ellipses For Each Print Swath," *IBM Technical Disclosure Bulletin:*29(9), 1987, pp. 3917–3920.

Douglas, B., "Strip–Buffer vs. Full–Page Bit–Map Imaging," *Byte*, vol. 12, Sep. 1987, pp. 229–230.

*Primary Examiner*—Edward L. Coles, Sr.
*Assistant Examiner*—Dov Popovici
*Attorney, Agent, or Firm*—Seed and Berry LLP

[57] ABSTRACT

A system and method for printer banding by which stored printer data files are processed a single time to create a set of bandable primitives corresponding to the entire page to be printed. If an object is larger than a preselected band size, the bandable primitives associated with that object are cut into banded sets of primitives corresponding to the preselected band size. The banded sets of primitives are sequentially converted to a bit-map data file for each of the bands. The bit-map data files are stored within a buffer until printed. The printer prints the entire page in the proper drawing order and allows a faster return to application than previously possible. A scrolling buffer may be used to increase efficiency of data processing by the printer.

7 Claims, 4 Drawing Sheets

SYSTEM AND METHOD OF PRINTER BANDING

CROSS-REFERENCE TO RELATED APPLICATION

This application is a division of U.S. patent application Ser. No. 07/911,523, filed Jul. 10, 1992.

TECHNICAL FIELD

The present invention relates to a system and method of printer banding. More specifically, the present invention relates to a system and method for using banding to increase efficiency of printing on a computer system.

BACKGROUND OF THE INVENTION

Computer systems are highly useful for compiling and assimilating large amounts of data. Computer systems frequently include graphic capabilities which allow the display and printing of graphic images. Printing a page of text and/or graphics images on a laser printer, for example, requires the conversion of data from the format used by the host computer system to the format used by a particular printer. Typically, the computer data is translated into a bit-map where each bit represents a dot on the printed page. The bit-map is generated within the host computer system and transferred to the printer in compressed data format. The compressed bit-map is expanded and transferred to a print engine, which is the name for the device that receives the bit-map data and converts it into the appropriate voltages to create a printed image. Some printer systems use large memories in the printer so that the host computer system can transfer the description for an entire printed page using an intermediate level printer language. The printer processes the entire page into a single bit-map data file.

The printed page is comprised of individual dots, called pixels. On a typical laser printer, there may be 300, 600, or more pixels per inch. Each pixel is usually represented by a single data bit in the printer memory. As the laser print engine scans a line, the data bits corresponding to that line are read and the laser beam turns on or off depending on the logic level of the data bit stored in that memory location. At a resolution of 300 pixels per inch, a printer requires approximately one megabyte of memory to store the bit-map data file for an entire page. As previously mentioned, some laser printers contain large memories to enable them to store an entire page. If a color laser printer is used, there can be as many as 24 bits per pixel to represent the various shades of color and intensities. Thus, a color laser printer would require 24 megabytes of memory to store an entire page.

To reduce the memory requirements of the printer, computers and printers of the prior art commonly use a technique known as banding. Banding involves breaking a printed page up into a number of horizontal segments or bands of a selected band size. It should be noted that the term horizontal refers to the orientation of the bands as referenced to the leading edge of the page as the page moves into the printer. The host computer system transfers the bit-map data file to the printer one band at a time. Because the band is smaller than an entire page, there is a corresponding decrease in the printer memory required to print a band. For example, a page, identified by reference numeral 2 in FIG. 1, may typically be broken down into sixteen bands 4a–4p of equal size. The printer memory requirements would be reduced by a factor of sixteen. The arrow 6 indicates the direction of movement of the leading edge of the page into the printer (not shown).

The trade-off is that the printing process takes longer. In systems of the prior art, a data file to be printed is stored in a file, typically called a metafile. The metafile contains the data for the entire page to be printed. To process the data for printing, the entire metafile is processed and converted into a bit-map format suitable for printing by the print engine. The systems of the prior art capture only that portion of the bit-map data that is needed for the particular band currently being printed and throws out the rest of the file. For example, the system processes the entire metafile into a bit-map data and prints the first band 4a of FIG. 1. The system only stores the bit-map data for the first band 4a, and does not retain the bit-map data for any other band. The system must then reprocess the entire metafile and take the bit-map data for the next band 4b to be printed, again throwing out everything else. In the case of a printer with sixteen bands, the systems of the prior art must process the metafile sixteen times in order to produce a single page. Computers do not store the entire bit-map data file in memory for the same reason that printers do not; namely the large amount of memory required to store a single page. Computers generally do not store the entire bit-map data file on a disk storage unit because the disk access and transfer times are unacceptably long.

While memory requirements have been reduced through the use of banding, the processing time has been drastically increased. Therefore, it can be appreciated that there is a significant need for a system and method of banding that will require less memory, but will not cause an increase in data processing time.

SUMMARY OF THE INVENTION

The inventive system determines the band size for a particular page and stores the data file which describes the entire printed page. The data file is read and transformed into a set of bandable primitives corresponding to the entire page and in a sequence that reflects the desired drawing order of objects on the printed page. The system then divides the bandable primitives at the predetermined band boundaries to create a set of primitives for each band. The band generator converts each banded set of primitives into a band of printer data corresponding to the predetermined band size and stores the band of printer data within a buffer. The system prints the data stored in the buffer and repeats the process for each band of data such that the host computer system does not need to process the stored data file once for each band.

The inventive method involves reading the stored data file and transforming the stored data file into a set of bandable primitives. The primitives are divided into bands corresponding to a predetermined band size. The method involves reading the first set of banded primitives and converting the banded primitives into a corresponding band of bit-map data. The bit-map data is temporarily stored in a buffer and printed. The steps are repeated for the remaining bands of data.

DETAILED DESCRIPTION OF THE INVENTION

Figure 1:
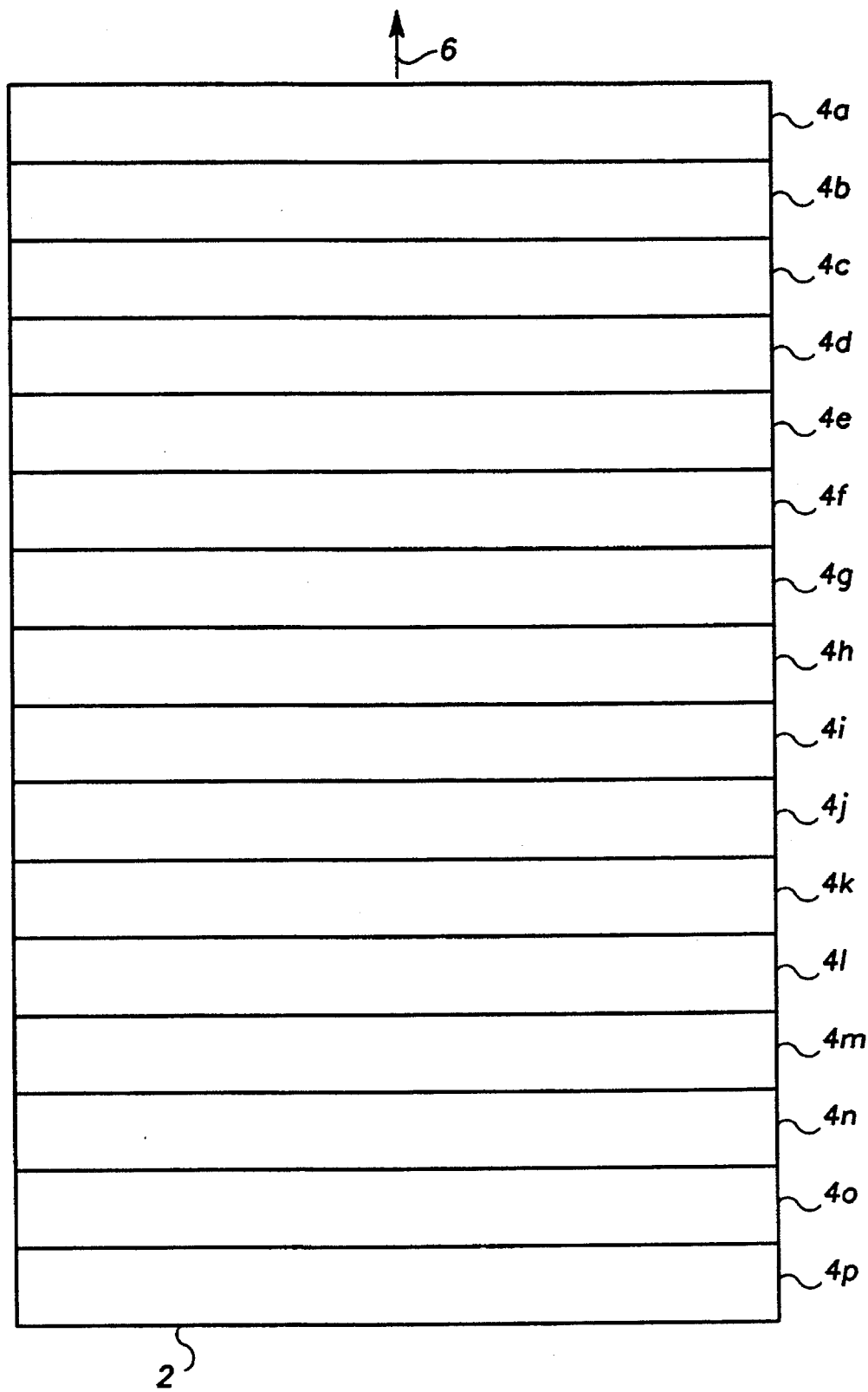
FIG. 1 shows a typical printed page divided into sixteen bands.

The present invention uses bands in the same manner as systems of the prior art. However, the data is processed in a novel fashion so that the host computer system does not transfer a bit-map band of data one band at a time like host computer systems of the prior art. Instead, the host computer system transmits a set of bandable primitives to the printer for the entire page. A primitive is a widely used term for a directive for drawing an object such as an alphanumeric character or a graphic object such as a line or rectangle. There is generally a one-to-one correspondence between draw primitives and printed objects such as an alphanumeric character or a graphic line. However, in some cases where graphic lines are closely associated with one another, a single draw primitive may define more than one graphics line. For example, a rectangle comprises four individual graphics lines that can be readily described by one draw primitive such as "draw object 1 with corners w, x, y, and z." A bandable primitive is a directive for drawing an object so that the object can be divided into horizontal segments corresponding to the bands. The printer processes the set of bandable primitives, following a task sequence list, to create a bit-map for each consecutive band. The band size is selected so that the bit-map data file describing the band may fit conveniently within a buffer memory in the printer used for temporary storage of the bit-map. The selected band size may vary depending on the amount of memory available on a particular band.

The data that is to be printed is stored within the host computer system in a format that may generically be called page description language (PDL). PDL is well known to those skilled in the art and will not be described herein. The PDL format describes the entire page in a single file called a metafile. The host computer system of the present invention processes the metafile and converts all objects into bandable primitives. In the presently preferred embodiment, the host computer system processes the metafile only one time to create a set of bandable primitives for the entire page.

When processing a page for printing, there are two conflicting goals to be met. The first is that drawing order must be maintained. That is, objects that appear to be drawn on top of one another on the display screen must appear that same way when they are printed on a printer. The second goal is that the page must be printed from top to bottom. A laser print engine cannot stop printing in the middle of a page or reverse itself without leaving unacceptable streaks on the printed page. The system of the present invention compromises to meet these two goals. The page is printed from top to bottom, and drawing order is maintained within a particular band by maintaining the task sequence list for each band. The task sequence list is ordered by the way in which the metafile has stored the graphic objects. When a user creates objects, the objects are stored within the metafile in the order in which the objects were created. If one object overlaps another, the objects have a specific drawing sequence or order by virtue of the sequence in which the objects were created and stored. Because the objects are transformed into bandable primitives and broken at the band boundaries, there is no need to be concerned about drawing order of any band except the band currently being processed. According to the principles of the present invention, a task sequence list is created for each band. The task sequence list is essentially a set of draw primitives for each band. The result is that the finished printed page looks exactly as the user had intended, and the system printed the page with less processing time than systems of the prior art without requiring any additional memory.

Figure 2:
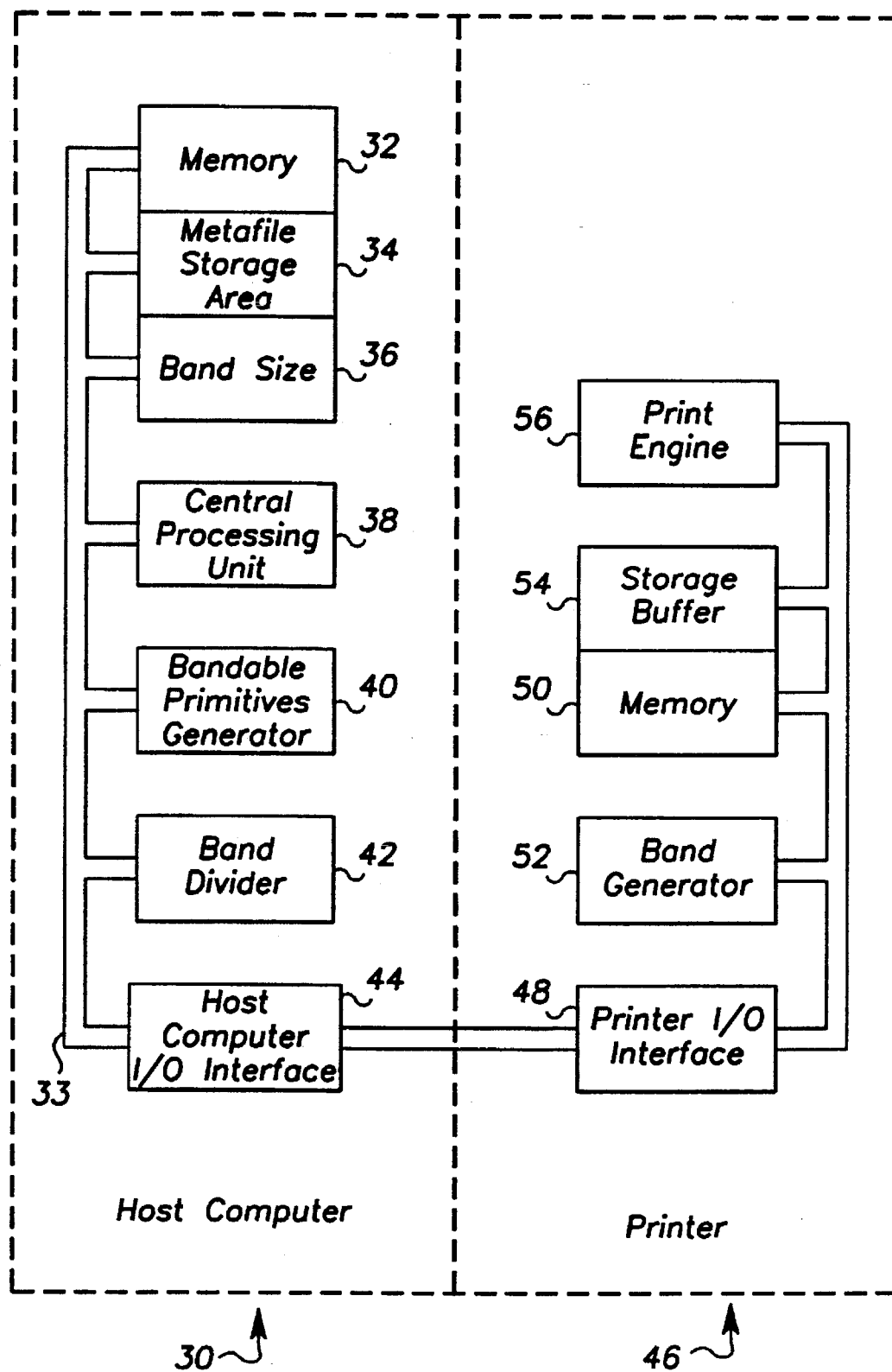
FIG. 2 shows a block diagram of the presently preferred embodiment of the present invention.

In the presently preferred embodiment, a host computer system 30 of the present invention is illustrated in FIG. 2. Under the direction of a central processor 38, the host computer system 30 reads a stored metafile from a metafile storage area 34 via a bus 33 which interconnects the various portions of the host computer system. A band size 36 is selected to correspond to the memory limitations of the host computer or a laser or other type printer 46 to which the host computer is connected. A bandable primitives generator 40 transforms the metafile into a set of bandable primitives that describe an entire page to be printed. A band divider 42 divides the bandable primitives at precise locations corresponding to the selected band size 36 creating a set of banded primitives for each of the bands. A host computer I/O interface 44 sends the entire set of banded primitives, in the form of a banded primitives data file, to the laser printer 46 connected to the host computer system 30. A printer I/O interface 48 receives the banded primitives data file and stores the file within a memory 50 of the printer 46. The printer memory 50 may comprise both random access memory (RAM) and read-only memory (ROM). The host computer I/O interface 44 and the printer I/O interface 48 may be a standard serial interface, parallel printer interface, or the like. A band generator 52 converts each band of the banded primitives data file into a bit-map data file for the particular band being processed. The bit-map data file is stored within a storage buffer 54 and transferred to a print engine 56 of the printer 46. The host computer system 30 needs to process the metafile only one time thus saving a great deal of data processing time while still using less memory than non-banding systems.

In an alternative embodiment, the band divider 42 is located within the printer 46. The band divider 42 operates in the same manner as described above. The host computer 30 contains the bandable primitives generator 40 and transfers the bandable primitives to the printer 46. Alternatively, the bandable primitives generator 40 and the band divider 42 could be located within the printer 46. In this embodiment, the host computer 30 transfers the metafile from the metafile storage area 34 to the printer 46. In yet another alternative embodiment, the band generator 52 is located within the host computer 30. This embodiment is useful in situations where the data transfer rate between the host computer 30 and the printer 46 is high enough to allow the bit-map data file for each band to be transferred to the printer 46 in real-time. That is, while the print engine 56 is processing one bit-map data file, the band generator 52 in the host computer 30 must convert the next set of banded primitives to a bit-map data file and transfer the bit-map data file to the printer 46. It is also possible to locate the storage buffer 54 in the host computer 30. In this embodiment all processing occurs in the host computer 30 and the print engine 56 would merely accept the data provided and create the analog voltages required to create the printed page.

The host computer system 30 performs initial processing of the data. As previously discussed, the data file that represents the page to be printed is often called a metafile. The metafile is stored in the storage area 34 within the host computer system 30. The storage area 34 may be a portion of a system memory 32 or a file on a hard disk or the like, however, any suitable storage area will suffice. The host computer system 30 also stores within the system memory 32, a value representing the selected band size 36. The value for the selected band size may also be stored within any other suitable storage location.

Figure 3:
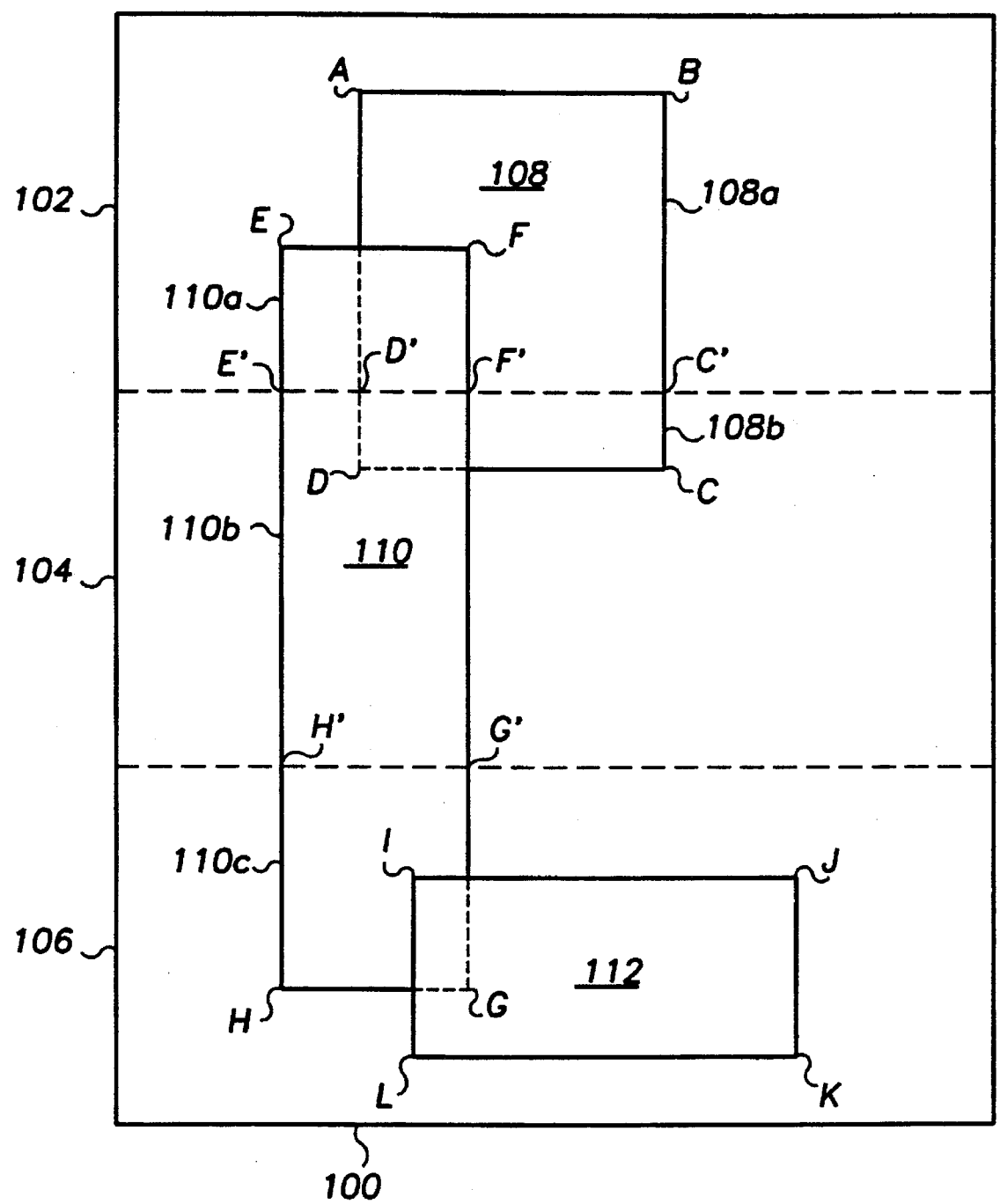
FIG. 3 depicts a typical printed page on which objects overlap each other and also extend beyond a single band on the page using a page divided into only three bands for simplicity.

Under control of the central processor 38 of the host computer system 30, the metafile is read a single time from the metafile storage area 34. As the metafile is read, the bandable primitives generator 40 analyzes the data and transforms the data into a set of primitives that may easily be broken into bands that correspond to the predetermined band size 36. In FIG. 3, for example, a page 100 has been divided into three horizontal bands 102, 104, and 106 for simplicity. A first object 108 is drawn in the first two bands 102 and 104, and appears to be beneath a second object 110. A second object 110 extends across all three bands 102, 104, and 106, and appears to be beneath a third object 112 which is contained entirely within the third band 106.

Prior art systems define the printed page 100 of FIG. 3 in the following manner:
1. Play the metafile, create bit-map data for first object 108 with corners A, B, C, and D and ignore all data that falls outside band 102, create bit-map data for second object 110 with corners E, F, G, and H and ignore all data that falls outside band 102, create bit-map data for third object 112 with corners I, J, K, and L and ignore all data that falls outside band 102 and transmit the bit-map data for band 102 to the printer;
2. Replay the metafile, create bit-map data for first object 108 with corners A, B, C, and D and ignore all data that falls outside band 104, create bit-map data for second object 110 with corners E, F, G, and H and ignore all data that falls outside band 104, create bit-map data for third object 112 with corners I, J, K, and L and ignore all data that falls outside band 104 and transmit the bit-map data for band 104 to the printer; and
3. Replay the metallic, create bit-map data for first object 108 with corners A, B, C, and D and ignore all data that falls outside band 106, create bit-map data for second object 110 with corners E, F, G, and H and ignore all data that falls outside band 106, create bit-map data for third object 112 with corners I, J, K, and L and ignore all data that falls outside band 106 and transmit the bit-map data for band 106 to the printer.

Note that the metafile must be replayed for each band and each time the data for the remaining bands is discarded.

In contrast, the host computer system 30 of the present invention plays the metafile a single time and transmits a banded primitives file to the printer to describe the entire page. The host computer system maintains the drawing order for the entire page by maintaining the drawing order for the band presently being processed. The drawing order is specified by the sequence in which the objects were initially created. The host computer system processes the metafile a single time to create the bandable primitives list for the entire page. Objects that cross band boundaries, such as first and second objects 108 and 110 are divided at the band boundaries. The host computer system then addresses the drawing order within the first band 102, and creates a list of tasks to be performed in sequential order by the printer 46. Thus, the first and second objects 108 and 110 will be drawn in the correct order. The host computer system then creates a task list for the second band 104 that will maintain the proper drawing order for that band, with the result that the first and second objects 108 and 110 are still in the proper order for the second band 104. Similarly, the host computer system creates a task list for third band 106, which specifies the drawing order for the overlapping second and third objects 110 and 112.

For example, the first object 108 in FIG. 3 overlaps bands 102 and 104. The band divider 42 (see FIG. 2) of the present invention divides the first object 108 into object 108a with corners A, B, C', and D', contained within the band 102 and object 108b with corners D', C', C, and D contained in the band 104. Similarly, the second object 110, which overlaps three bands 102, 104, and 106, is divided into three objects. Object 110a with corners E, F, F', and E' is contained within the band 102, object 110b with corners E', F', G', and H' contained within the band 104, and object 110c with corners H', G', G, and H contained within the band 106. The third object 112 is contained entirely within the band 106. Therefore the band divider 42 does not divide object 112 into banded primitives, but merely defines the third object 112 with corners I, J, K, and L within the band 106. The host computer system places these six defined objects into their respective bands and creates a task sequence list for each band so that the drawing order is maintained. A typical task sequence list for the present invention is illustrated by steps 2–4 of the following sequence of events:
1. Play the metafile;
2. For band 102, draw the object 108a with corners A, B, C', and D' then draw object 110a with corners E, F, F', and E';
3. For band 104, draw the object 108b with corners D', C', C, and D then draw the object 110b with corners E', F', G', and H';
4. For band 106, draw the object 110c with corners H', G', G, and H then draw the object 112 with corners I, J, K, and L; and
5. Transmit the task sequence lists to the printer.

Note that the host computer system 30 has not created nor transmitted bit-map data. Instead, the host computer system transmits much shorter task sequence lists to the printer 46. The task sequence lists instruct the printer to create the objects defined by the banded primitives in the order defined by the order of the instructions. Further processing of the data occurs within the printer 46 leaving the host computer system 30 free to perform other tasks. The processing of task sequence lists by the printer will be discussed in greater detail below.

It is clear that certain shapes such as rectangles and straight lines can be easily divided into a series of horizontal bands. Similarly, any data already stored within the host computer system 30 as a bit-map, such as character fonts, are also easily divided into horizontal bands. Many newer laser printers have font scaling technology, such as "TrueType" fonts, which use mathematical algorithms to construct bit-maps of alphanumeric characters rather than storing a limited number of fonts in printer read only memory (ROM) as a bit-map. When these printers receive a command to print a particular character of a certain size and font style, the printer uses the appropriate algorithm to construct a bit-map of that character and stores the bit-map within the printer memory 50 in case that character is used again. The present invention works equally well with older laser printers and the newer printers with font scaling technology.

As previously discussed, if the host computer system 30 has a graphic object stored as a bit-map, the task of dividing the object into bands is simple because some bits of the bit-map will fall into each band. For alphanumeric characters stored as bit-maps in the printer, or for font scaling printers, the host computer system 30 transfers two arguments to the printer 46. The first argument identifies the character, the font type and the font size. The second argument tells the printer 46 where to cut the character for a particular band. Some alphanumeric characters may be used in many locations throughout a page. Since the printer 46 already has the character stored in bit-map form in printer memory 50 (for both the old ROM stored fonts and the font scaling printers), the host computer system 30 will specify the same first argument and a different second argument when a particular character is used a second time. This is particularly useful with font scaling printers because a great deal of time is saved by not having to convert alphanumeric characters to bit-maps within the host computer system 30 and allowing the printer 46 to store the bit-map within its own memory 50. While the previous process described the conversion of alphanumeric characters to a bit-map within the printer, it is clear to those skilled in the art that the conversion to a bit-map could take place within the computer or the printer. The bit-maps of the characters are divided into the appropriate bands according to the directives of the second argument passed to the printer 46 from the host computer system 30.

Figure 4:
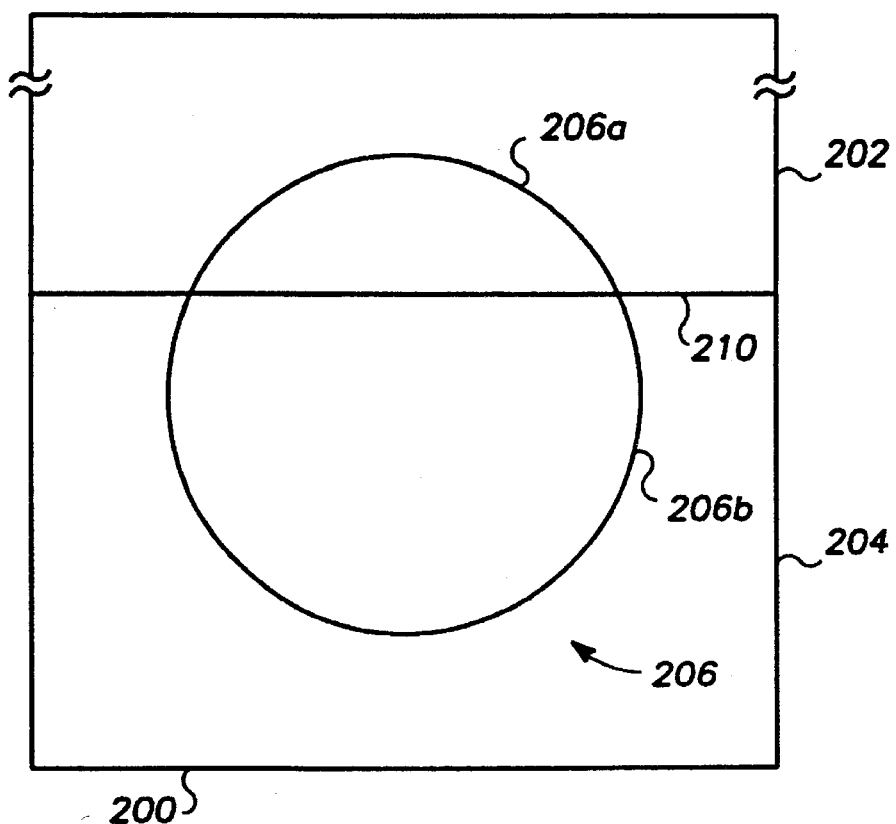
FIG. 4 depicts a circle as a graphic object extending over a band boundary.
Figure 5:
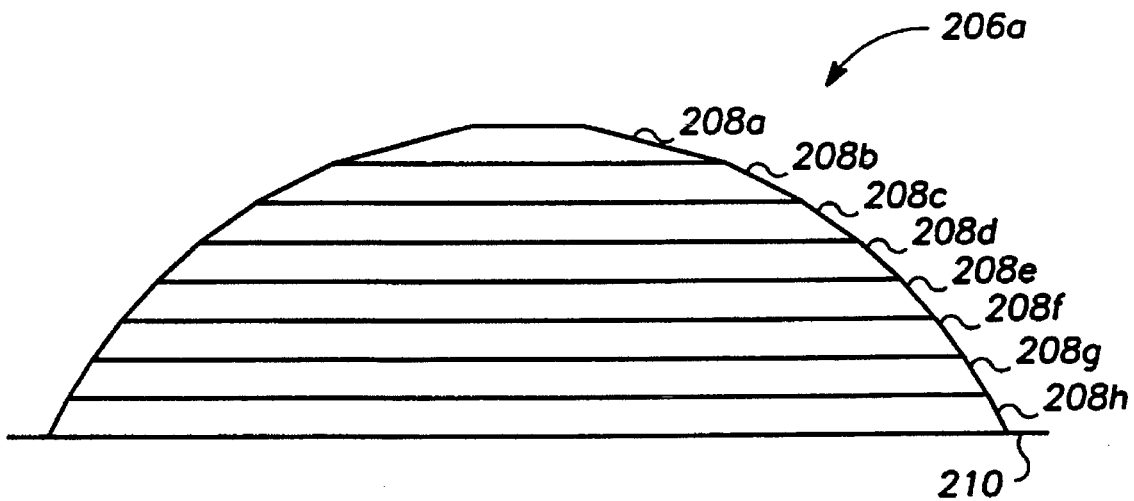
FIG. 5 depicts a magnified portion of the circle of FIG. 4 and illustrates a manner in which graphic objects can be approximated.

Other graphic objects, such as circles, are more difficult to divide into horizontal bands. Objects such as circles must be approximated in a manner that allows them to be easily divided into horizontal bands. It is well known to those skilled in the art that graphic objects may be represented by a series of simple geometric shapes. For example, circles are often represented as a series of rectangles or trapezoids with varying dimensions. In FIG. 4, a partial page 200 is divided into two bands 202 and 204. According to the principles of the present invention, a circle 206 is divided into two objects 206a and 206b corresponding to the bands 202 and 204, respectively. In the presently preferred embodiment, graphic objects such circles are divided into a series of trapezoids. The object 206a of the top portion of the circle 206 is in band 202 of FIG. 4, and is approximated by a series of trapezoids 208a–208h, shown in FIG. 5. The lower side of trapezoid 208h coincides with a boundary 210 between bands 202 and 204. Therefore, the circle 206 will be divided between the two bands at the lower side of the trapezoid 208h. In similar fashion, other complex graphic objects may be approximated. The point of intersection of an object and a band boundary can be determined for any object through the use of simple geometry and mathematics. The various techniques for determining the point of intersection with a band boundary are well known to those of ordinary skill in the art and will not be discussed herein.

Except for the font scaling discussed above, all of the processing described up to this point takes place within the host computer system 30 without any interaction with the printer 46. However, it is clear to those of ordinary skill in the art that the inventive process could occur within the printer as well. The metafile can be transferred to the printer without any processing. In this embodiment, the bandable primitives generator 40 and the band divider 42 are located within the printer 46. The bandable primitives generator 40 and the band divider 42 perform the identical function as previously described, but the functions are performed within the printer 46. Alternatively, the bandable primitives generator 40 could be in the host computer system 30, and the band divider 42 could be located within the printer 46.

In prior art systems, the host computer system does all of the processing and transmits only the bit-map data corresponding to each band to the printer. In contrast, the host computer system 30 of the present invention analyzes each of the objects and breaks the objects into bands. The host computer system then transmits the task sequence lists, which define an entire page rather than a single band, to the printer. Only the task sequence lists are transmitted to the printer thus allowing the host computer system to return to an application program in less time than prior art systems. The time required to actually transmit data to the printer 46 is also minimized due to the fact that the task sequence lists are generally shorter in length than a bit-map data file.

The task sequence list is transmitted to the printer 46 by the host computer I/O interface 44 within the host computer system 30. The task sequence list is received by the printer I/O interface 48 within the printer 46 and stored in the printer memory 50. Once the printer 46 has received the task sequence list, the printer performs the conversion from bandable primitives format into a bit-map. As previously stated, the present invention must meet the twin goals of printing the page from top to bottom and maintaining the proper drawing order. The first goal is met by printing the bands in the appropriate sequence. The second goal, maintaining proper drawing order, is met by printing the objects in the order specified by the task sequence list.

The task sequence list is converted into a bit-map file, one band at a time, by the band generator 52 of the printer 46. Within each band, the proper drawing order is maintained by virtue of the order in which the task sequence list was created by the host computer system 30 from the metafile. The bit-map data for the band is temporarily stored in the printer storage buffer 54 which may comprise part of the printer memory 50, but may be stored in any other suitable storage location. The bit-map data for the band is transferred to the print engine 56 scan line by scan line the same as with prior art systems. The print engine 56 converts the bit-map data into voltage signals that create the printed page.

The present invention also checks the task sequence list for each of the bands to see if any tasks from one band are repeated in a subsequent band. If a part of any task sequence list is repeated, the printer memory will retain the bit-map data corresponding to the repeated portion of the task sequence list. Saving bit-map data that will be repeated in a subsequent band saves time by converting a portion of a task sequence list only once and reusing the same bit-map data in another band. This is particularly useful with font scaling laser printers where alphanumeric characters are frequently used in multiple locations on a single page.

Another time saving technique of the present invention utilizes the storage buffer 54 as a scrolling storage buffer. The transfer of data from the storage buffer 54 to the print engine 56 occurs at a much slower rate than the rate of data transfer from the band generator 52 to the storage buffer 54. Therefore, the printer 46 can be processing task sequence lists for subsequent bands while the print engine 56 is printing out the current band. The storage buffer 54 has a capacity that is larger than needed for a single band. The capacity is about twice the size of a band so that the bit-map for one band may be loaded into the storage buffer 54 and, while the bit-map data for one band is being transferred from the storage buffer to the print engine 56 scan line by scan line, the band generator 52 is converting the next sequential band into a bit-map and storing it in the additional storage space within the scrolling storage buffer. Thus, the storage buffer 54 is being filled up with the bit-map for the next sequential band while the bit-map data for the present band is being transferred to the print engine 56. This continuous process allows maximum utilization of resources as the storage buffer 54 scrolls from the top of the page to the bottom.

Those skilled in the art will appreciate that the dramatic new approach taken by the present invention increases the speed and efficiency of data processing for printer applications without requiring more memory than prior art systems. The end-user will notice that the printing speed has been greatly increased while the printed page is exactly what the user expected.

It is to be understood that even though various embodiments and advantages of the present invention have been set forth in the foregoing description, the above disclosure is illustrative only, and changes may be made in detail and yet remain within the broad principles of the present invention. Therefore, the present invention is to be limited only by the appended claims.

We claim:

1. A method used on a printer for printing a page of data with unidirectional page movement, using an unprocessed data file that describes a plurality of objects to be printed on the page and a user specified appearance of the plurality of objects to be printed on the page, by defining a plurality of bands for the page, each of the bands having a selected band size, the printer coupled to a computer having a memory storing the unprocessed data file, the method comprising the steps of:

receiving the unprocessed data file from the computer;

transforming the unprocessed data file into bandable primitives for each of the bands, said bandable primitives for each band corresponding to the plurality of objects and portions of the plurality of objects within that band;

storing said bandable primitives in a manner indicative of a data processing sequence determined by the user specified appearance of the plurality of objects to be printed on the page;

dividing said bandable primitives into sets of banded primitives corresponding to the bands to generate an independent set of banded primitives for each of the bands with each of said set of banded primitives describing only the plurality of objects and portions of the plurality of objects within the respective one of the corresponding bands, said set of banded primitives for each of the bands maintaining said data processing sequence determined by the user specified appearance of the plurality of objects to be printed on the page;

converting a first sequential set of banded primitives into a first sequential bit-map data file;

temporarily storing said sequential bit-map data file in a storage buffer;

printing said bit-map data file stored in said buffer on the page with unidirectional page movement, and;

repeating said steps of converting, temporarily storing, and printing for the next sequential set of banded primitives until each of the sets of banded primitives has been converted into said bit-map data files and printed on the page with unidirectional page movement, whereby the computer does not process the unprocessed data file one time for each of said bands in order to generate said bit-map data files.

2. The method of claim 1, further including the step of saving a portion of data from one of said bit-map data files within the printer if said saved portion will be used in a subsequent one of said bit-map data files, whereby the step of converting said bit-map data file is simplified by having said saved portion already converted.

3. The method of claim 1 wherein said storage buffer stores said next sequential bit-map data file while the printer is printing said current bit-map data file, whereby said steps of converting, temporarily storing, and printing are continuously generating said bit-map data files, storing said bit-map data files, and printing said bit-map data files on the page.

4. A system for processing a page of data to be printed on a printer with unidirectional page movement, using an unprocessed data file that describes a plurality of objects to be printed on the page and a user specified appearance of the plurality of objects to be printed on the page, by defining a plurality of bands for the page, each of the bands having a selected band size, the printer coupled to a computer having a memory storing the unprocessed data file, the system comprising:

a controller to transfer the unprocessed data file from the computer to the printer;

a processor to transfer the unprocessed data file into bandable primitives for each of the bands, said bandable primitives for each band corresponding to the plurality of objects and portions of the plurality of objects within that band and to store said bandable primitives in a manner indicative of a data processing sequence determined by the user specified appearance of the plurality of objects to be printed on the page; and a band divider to divide said bandable primitives into sets of banded primitives corresponding to the bands to generate a set of banded primitives for each of the bands with each of said set of banded primitives describing only the plurality of objects and portions of the plurality of objects within the respective one of the corresponding bands, said set of banded primitives for each of the bands maintaining said data processing sequence determined by the user specified appearance of the plurality of objects to be printed on the page, whereby the printer processes the unprocessed data file into said banded sets of primitives with each of said banded sets of primitives maintaining said data processing sequence determined by the user specified appearance of the plurality of objects to be printed on the page, whereby the computer does not process the unprocessed data file one time for each of said bands in order to generate said bit-map data files.

5. The system of claim 4, further including a renderer to convert each of said sets of banded primitives into a corresponding bit-map data file, said corresponding bit-map data file being sized according to the selected band size of the page.

6. The system of claim 5, further including a storage buffer to temporarily store said corresponding bit-map data file and a print engine coupled to said storage buffer to print said corresponding bit-map data file.

7. The system of claim 5, further including a storage buffer to save a portion of data from one of said corresponding bit-map data files if said saved portion will be used in a subsequent one of said corresponding bit-map data files.

* * * * *